May 25, 1926.
W. G. WILSON
VALVE
Filed Nov. 4, 1922
1,586,346
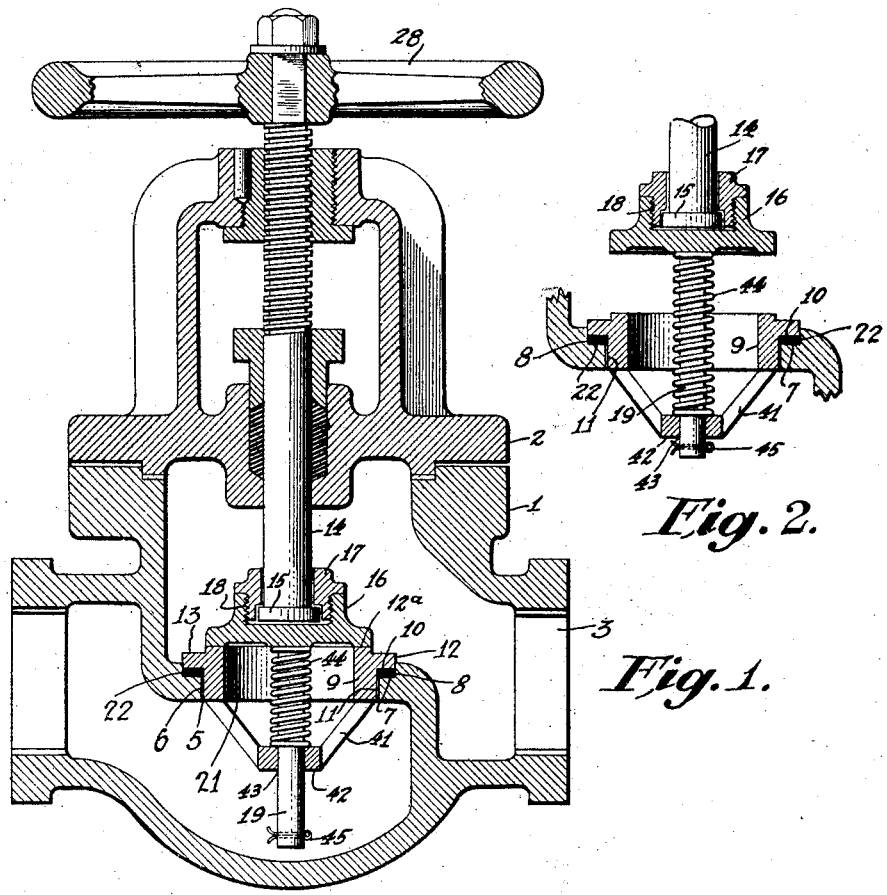
Fig. 2.
Fig. 1.
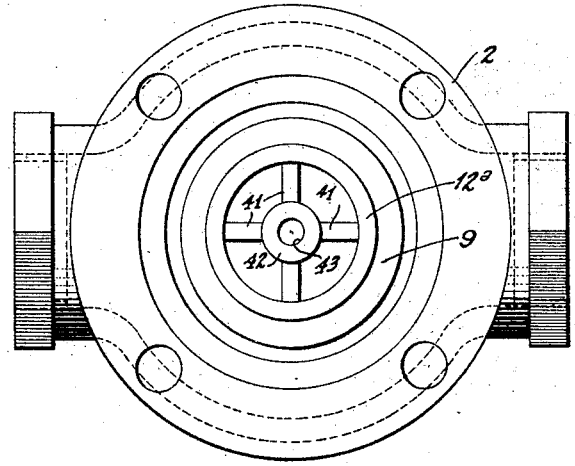
Fig. 3.
INVENTOR.
Wylie G. Wilson
BY
Stewart Perry
his ATTORNEYS.

Patented May 25, 1926.

1,586,346

UNITED STATES PATENT OFFICE.

WYLIE G. WILSON, OF JERSEY CITY, NEW JERSEY, ASSIGNOR TO LOOSE SEAT VALVE COMPANY, A CORPORATION OF DELAWARE.

VALVE.

Application filed November 4, 1922. Serial No. 598,975.

This invention relates to an improvement in valves and has particular relation to the mounting of a removable valve seat in association with a valve port, together with the providing of means whereby the valve seat is held in cooperation with said port, notwithstanding the movement of the valve element in relation thereto, and notwithstanding the fact that the valve may be placed in a vertical position or in any position where the removable valve seat would be likely to fall out of its cooperative relation with its seat. The invention also has to do with means for so associating a gasket with said removable valve seat and its seating in association with a valve port as to entirely enclose the gasket between the relative parts of said removable valve seat and its seating; this may be preferably, but not necessarily, arranged so that when pressure is brought to bear upon the valve seat the gasket will expand sidewise to the pressure so that all of its faces will have a bearing by reason of its enclosure between the valve seat and the wall of the valve port.

The invention is illustrated in the accompanying drawings, the several parts being designated by numerals, like numerals referring to like parts.

Fig. 1 is a vertical section of the valve and valve seat, the casing and valve operating means.

Fig. 2 is a detailed view showing the construction of Fig. 1 with the valve open; and Fig. 3 is a plan view of the removable valve seat with the valve removed.

Referring to Fig. 1, 1 and 2 form the two halves or parts of a valve casing. 3 is an inlet port and 4 an outlet port leading through section 1 of the casing and 5 is a port interposed within the casing. 6, 7 and 8 represent the stepped surfaces forming the wall of the port 5, the surface 7 being in a plane at right angles to the axis of said port and the surfaces 6 and 8 being parallel therewith. 9 is a removable valve seat formed with a stepped periphery adapted to cooperate with said stepped formation of the wall of the port 5, said removable valve seat having one face as 10 at right angles to its axis and two faces as 11 and 12 parallel with such axis. While the stepped angular relation of the corresponding faces of the removable valve seat and its seat about the port are described with particularity both in the specification and claims, it is not intended to limit the same absolutely to such angular relation for it will be apparent that the angular relation of said steps may be varied without departing from the invention, the angular relation being defined only with the purpose of defining the structure illustrated. It is also provided with a surface as 12$^a$ adapted to cooperate with a suitable valve element and a surface 13 adapted to present a face to fluid pressure when the valve is closed operating to hold the valve seat seated. 14 is a valve stem suitably mounted to reciprocate within that half of the valve casing indicated as 2. The stem is provided at the end thereof with an enlarged section as 15. 16 is a valve element adapted to cooperate with the valve seat 9. 17 is a screw cap mounted on the valve stem 14, the same being provided with a screw thread as 18 adapted to cooperate with a corresponding screw thread in the valve element 16. The removable valve seat 9 is also provided with a dependent sleeve 21 adapted to enter the port 5 with a loose fit. The surface 12 of the valve seat is also formed to have a loose or easy fit with the surface 8 of the port seat. The cooperation of these surfaces operates to prevent the valve seat 9 from falling out of its seat in the port should the valve be placed on its side when the head of the casing is removed; that is to say, by reason of this construction, the valve seat will retain its seated position when in a vertical position, and even slightly beyond the vertical.

As stated, the sleeve 21 extends into the port 5 with a loose sliding fit and the gasket 22 is enclosed within the space formed by the faces 7, 10, 8 and 11. This gasket is preferably of such size and form that when pressure is exercised upon the removable valve seat, by the valve stem, the gasket will be expanded sidewise of the pressure to engage and make contact with said faces so as to completely fill the chamber formed between the removable valve seat and the stepped portion surrounding the port, resulting in the establishment of a sealed relation not only between the faces which are in a plane at right angles to the axis of the seat of the port, but also between the faces of such stepped portion which are parallel with such axis.

It will also be noted that the face 13 of the valve seat presents a surface which will be affected by the fluid pressure controlled by the valve to tend to cause the valve seat to be seated, and this pressure will continue to operate during the operation of the valve under pressure.

I further provide the removable valve seat 9 with a plurality of radial arms 41 adapted to support the axial guide 42 which is perforated with an axial aperture 43. A guide stem 19 carried by the valve element 16 extends through this aperture. I then interpose between the valve element and said axial guide a helical spring as 44. This spring is so constituted that the tension thereof will not be entirely relieved by reason of the opening of the valve as indicated in the detail view Fig. 2, but will always be of sufficient strength to hold the valve seat seated in both open and closed position. 45 is a cotter pin piercing the guide shaft 19 at the base thereof, said cotter pin adapted to engage the axial base 42 so that when the valve case is unlimbered, both the valve and the valve seat will be withdrawn by the removal of the valve casing part 2. It will be apparent, however, that so long as the casing parts 1 and 2 are assembled, the spring 44 will at all times maintain the valve seat in position on the gasket 22 and said valve seat cannot get out of place even though the casing be inverted.

Hence it will be noted that provision is made in this invention for a removable valve seat, with means for mounting the same in association with a port, in combination with means for holding the valve seat in relation with the port, the latter means taking the form of fluid pressure controlled by the valve, and an elastic means, acting on the valve seat to hold the same in relation with its port. Provision is also made for mounting both the valve element and its seat in such relation with the part 2 of the valve casing that both will be removed when said part 2 is removed from the part 1 of the casing.

It will be noted, however, that the spring 44 is so constituted as not to bear unduly on the valve seat in the operation of assembling the casing. If the arrangement were otherwise difficulty might be experienced in establishing a proper relation between the parts.

What I claim is:

1. A valve having a casing provided with a port, a removable valve seat member adapted to cooperate with said port, a sealing element cooperable with one side of the valve seat member, a valve stem for operating the sealing element to move said sealing element into and out of engagement with the valve seat member, and resilient means interposed between the sealing element and the valve seat member, and constituted to bear upon the valve seat member for the purpose of maintaining said member in cooperative relation to said port while the sealing element is both engaged and disengaged from the valve seat member.

2. A valve having a casing provided with a port, a removable valve seat member adapted to cooperate with said port, a sealing element cooperable with one side of the valve seat member, a valve stem for operating the sealing element to move said sealing element into and out of engagement with the valve seat member, and a spring interposed between the sealing element and the valve seat member, and constituted to bear upon the valve seat member for the purpose of maintaining said member in cooperative relation to said port while the sealing element is both engaged and disengaged from the valve seat member.

3. A valve having a casing provided with a port, a removable valve seat member adapted to cooperate with said port and having an axial base rigid therewith, a sealing element, means for moving said sealing element into and out of seated relation with respect to the valve seat member, and a spring interposed between the axial base and the sealing element to bear upon the axial base while the sealing element is both seated and unseated for the purpose of maintaining the valve seat member in cooperative relation with the port.

4. A valve having a valve casing divided into a plurality of parts, one of which is provided with a port, a removable valve seat member adapted to cooperate with the port, and having an axial base rigid with the valve seat member, a sealing element, cooperable with the valve seat member, a valve stem carrying the sealing element and operable through a part of the valve casing other than that part which includes said port, means to reciprocate the valve stem for the purpose of seating and unseating the sealing element, a spring interposed between the sealing element and said axial base for the purpose of maintaining the valve seat member in cooperative relation to the port under elastic pressure, and means for limiting the relative movement of the sealing element in a direction away from the valve seat member to a predetermined maximum, whereby further movement of the sealing element in said direction will remove the valve seat member from cooperative relation with the port.

5. A valve comprising a valve casing divided into a plurality of parts, one of said parts having a port adapted to cooperate with a removable valve seat, a removable valve seat adapted to cooperate with said port, said valve seat being provided with radial dependent arms supporting an axial base perforated with an axial aperture, a valve stem carried by another of said parts of the valve casing, said stem carrying a valve element adapted to cooperate with said valve seat and an axial shaft adapted to reciprocate within the axial aperture of said axial base, a spring interposed between said valve element and said axial base of the removable valve seat, said spring so constituted as to bear upon the said axial base at all times in both the open and closed position of the valve.

6. A valve comprising a valve casing divided into a plurality of parts, one of said parts having a port adapted to cooperate with a removable valve seat, a removable valve seat adapted to cooperate with said port, said valve seat being provided with radial dependent arms supporting an axial base perforated with an axial aperture, a valve stem carried by another of said parts of the valve casing, said stem carrying a valve element adapted to cooperate with said valve seat and an axial shaft adapted to reciprocate within the axial aperture of said axial base, a spring interposed between said valve element and said axial base of the removable valve seat, said spring so constituted as to bear upon the said axial base at all times in both the open and closed positions of the valve, means associated with said axial shaft and said axial base to limit the movement of the axial shaft within said axial aperture so that said valve and its seat will be removed together when the parts of the casing are separated.

Signed by me at New York this 2nd day of November, 1922.

WYLIE G. WILSON.